3,174,818
REDUCING CORROSION OF STAINLESS STEEL IN HOT NITRIC ACID SOLUTIONS BY ADDING CARBON BLACK OR ELEMENTAL SULFUR TO THE SOLUTION
Francis G. Rust, Evans, Ga., assignor to the United States of America as represented by the United States Atomic Energy Commission
No Drawing. Filed Oct. 9, 1962, Ser. No. 229,507
9 Claims. (Cl. 21—2.5)

The present invention relates to a novel method of reducing the corrosion of stainless steel by nitric acid solutions at elevated temperatures and containing dissolved chromium values. More particularly it relates to the reduction of corrosion of stainless steel evaporating vessels by chromium-containing waste solutions that result from the dissolution of nuclear reactor fuels.

Stainless steel is widely used for equipment to handle nitric acid solutions because it is the cheapest material available having adequate corrosion resistance under ordinary conditions. (The corrosion of stainless steel in 10 M nitric acid at room temperature is less than two mils per year.) However, there are conditions under which corrosion rates are appreciable and repair or replacement of equipment becomes costly. Corrosion rates increase with temperature, particularly at or near the atmospheric boiling point of the solution. The rates also increase with acid concentration and the concentration of iron and chromium in solution. All of these adverse conditions may exist simultaneously, for example, in an evaporator for concentrating nuclear waste streams. When this occurs the corrosive effect of such a solution is especially severe upon the stainless steel vessel.

A well-known catalyst for the corrosion of stainless steels by nitric acid solutions is chromium in the +6 oxidation state. This catalytic action becomes especially effective when the nitric acid solution is at an elevated temperature, e.g., around its atmospheric boiling point and the acid concentration is around four molar or above. Chromic ions added to such a solution will normally undergo slow oxidation, affording a build-up of $Cr^{+6}$ ions. Low concentrations of +6 chromium ions (0.005 gram/liter) have been found to increase the corrosion rate of stainless steels in boiling nitric acid solution by a factor of about ten. This is especially unfortunate as far as the nuclear waste solution disposal art is concerned in that chromium sometimes appears in relatively high concentrations (around 20 grams/liter) in a high temperature nitric acid solution. One method of processing spent nuclear fuels that are clad with stainless steel is to dissolve the cladding electrolytically in nitric acid. This method provides solutions of high chromium and iron content—around 20 grams/liter of Cr and 60 grams/liter of Fe. After extraction of the uranium or other fuel values, the resulting waste solution is usually fed into an evaporator to reduce the volume of radioactive waste solution. Thus, the corrosive effect of such a high temperature waste solution containing high concentrations of chromium and iron on the stainless steel evaporator vessel is especially severe. Accordingly, the evaporator vessels and components would have to be replaced frequently. If a nitric acid solution, initially free of any chromium and iron ions is boiled in a stainless steel vessel for several days corrosion will occur. Under these conditions the nitric acid solution will progressively dissolve the stainless steel vessel, thereby affording a build-up of chromium and iron as corrosion products. As this occurs, the corrosion becomes especially severe due to the autocatalytic effect of the build-up of the catalysts—chromium and iron—in the solution. Ordinarily the solution passes through the stainless steel equipment too quickly for this build-up of chromium and iron to take place, but in the waste solution evaporation process the boiling nitric acid solution is maintained in contact with the stainless steel vessel a sufficient length of time to provide such a build-up of corrosion products, resulting in serious corrosion to the vessel.

No practical substitute for stainless steel as a construction material for vessels containing boiling nitric acid solutions is known. Some metals, such as titanium, tantalum, and columbium could be used, but are very costly and difficult to fabricate. Glass has the necessary chemical inertness, but lacks the mechanical strength which is desirable for the safe handling of waste solutions which contain dangerously radioactive fission products. Consequently, there has been an increasing concern over finding effective means for mitigating the corrosion of stainless steel by boiling nitric acid solutions containing dissolved chromium. Especially is this true where the stainless steel is used for fabricating evaporator vessels for concentration of waste.

Accordingly, a general object of the invention is to provide a method for reducing the corrosion of stainless steels by a nitric acid solution at an elevated temperature and containing dissolved chromium.

A more particular object is to provide a method for reducing the corrosion of stainless steel evaporator vessels by a chromium-containing nitric acid solution at an elevated temperature.

Still, another object is to provide a method for reducing the corrosion of stainless steel evaporator vessels by a boiling nitric acid solution containing dissolved stainless steel.

Additional objects will become apparent hereinafter.

In accordance with the present invention a novel and improved method for inhibiting the corrosion of stainless steel by a nitric acid solution which is at or near its atmospheric boiling point, and which contains dissolved chromium comprises adding to the solution a quantity of a member selected from the group consisting of carbon black and sulfur. Carbon black and sulfur might be expected to act as catalysts for the corrosion of stainless steel by nitric acid solutions. However, applicant has found that these rather surprisingly act to inhibit the corrosive action of chromium in boiling nitric acid solutions on stainless steels. Whereas boiling solutions of nitric acid containing chromium in the +6 oxidation state were very corrosive upon the stainless steel vessel, the corrosion rate was reduced by a factor of five when carbon black was added to the solution and by a factor of around eighteen when sulfur was added. It is especially surprising that carbon black exhibits this corrosion inhibition property in that other allotropic forms of carbon, such as graphite, provide an insignificant reduction in the corrosion rate of stainless steels by boiling nitric acid solutions containing +6 chromium ions. No complete explanation for this phenomenon is known. However, it has been suggested that the reason chromium in the +6 state acts as a catalyst for the corrosion of stainless steels by boiling nitric acid solution is that the +6 chromium oxidizes a hydrated chromic oxide film on the metal surface and causes it to go into solution as a chromate ion, whereupon the nitric acid is free to attack the base metal. Applicant has discovered that carbon black and sulfur, in some way, interfere with this oxidizing action by the +6 chromium ions, possibly by reacting with the nitric acid thereby producing oxides of nitrogen, carbon, or sulfur which in turn reduce the +6 chromium ions to the +3 oxidation state before they can oxidize the hydrated oxide film. It is rather surprising that carbon black and sulfur, both being weak reducing agents and being disposed in such a strong oxidizing solution, could afford such a reduction in the corrosion rate. One would think that the reducing effect of carbon black and sulfur on +6 chromium ions in such a boiling solution would be almost negligible, due to the strong oxidizing effect the nitric acid has upon maintaining the chromium in the higher oxidation state. Too, it could be expected that in a boiling nitric acid solution, the concentration of any oxides of nitrogen, carbon, or sulfur would be low. However, with as little as 2 grams of carbon black or sulfur added/liter of boiling solution/day, the corrosion rate was markedly reduced.

The techniques of practicing this invention may vary widely. Since carbon black is a solid that does not readily go into solution it may be added without regard to stoichiometry, short, of course, of adding such gross amounts that the equipment becomes clogged or the contact between the reactants is actually interfered with and then replenished whenever it begins to lose its inhibition effect. Applicant has found that with the addition of about two grams of carbon black/liter of boiling solution/day to boiling 6 M nitric acid solution containing dissolved chromium therein, adequate reduction in the corrosion was afforded; therefore applicant prefers this addition rate. With this addition rate the corrosion rate of 304L stainless steel was reduced from 56 to 10 mils per year. It is to be understood that the applicability of this invention extends over the range of austenitic, ferritic, and martensitic stainless steels. With the austenitic stainless steels, the type 309cb stainless steel has demonstrated a somewhat higher corrosion rate than that of type 304L stainless steel.

While applicant has found that carbon black effectively reduces the corrosion rate of stainless steel by boiling nitric acid solutions containing dissolved chromium, it also has been found that this is generally applicable to boiling nitric acid solutions containing dissolved stainless steel. The reduction in the corrosion rate for solutions containing dissolved stainless steels was somewhat less than that experienced with solutions containing only chromium ions. As is known, nitric acid solutions containing dissolved iron are corrosive to stainless steels. This corrosion is understood to take place by different mechanism than that postulated for the corrosion by +6 chromium ions. Also, it is thought that where both iron and chromium are present the corrosion of the stainless steel will proceed by two different, but additive, mechanisms. However, in such highly corrosive surroundings as boiling nitric acid solutions containing dissolved stainless steel (Fe-Cr-Ni), carbon black is still able to inhibit the corrosive action of the +6 chromium ions but the iron affects the overall reduction factor somewhat.

As is known nitric acid solutions at or around room temperature normally exhibit very little corrosive effect upon stainless steel but as the temperature of the solution is increased it becomes highly corrosive, especially is this true as the temperature of the solution approaches its atmospheric boiling point. It is to be appreciated that the applicability of this invention extends to nitric acid solution at any elevated temperature containing dissolved chromium, whereupon the corrosive nature of such a solution becomes acute.

As noted hereinbefore instead of carbon black, elemental sulfur may be used to reduce the corrosion rate of boiling nitric acid solutions containing dissolved chromium values. While the addition of 2 grams of sulfur/liter of boiling solution/day to the solution affords greater reduction in the corrosion rate than that experienced by carbon black, carbon black is greatly preferred in that sulfur tends to float, clogging the equipment, sublimes, and produces solid reaction corrosion products, whereas the main reactant product of carbon black is carbon dioxide which is easily removed and thereby one does not have any clogging problem. It is thus to be appreciated that where fouling of condenser surfaces does not present a problem one may desire to use sulfur instead of carbon black because of the greater reduction in corrosion rate per unit weight.

Further illustration of the quantitative aspects and procedures of the present invention is provided in the following examples. In Example 1, the catalytic action of carbon black on boiling nitric acid solutions on 304L stainless steel is demonstrated.

EXAMPLE I

Three 1" x 1" x ¼" standard corrosion test coupons of 304L stainless steel were immersed in 500 cc. of 6 M nitric acid solution in respective glass flasks. In all cases the solution was brought up to boiling (around 115° C.), whereupon carbon black (solid) was added at a rate of 2 grams/liter of boiling solution/day to the first two flasks, with none added to the third flask. Boiling continued until the next day, whereupon the coupons were each withdrawn from its flask, dried, weighed, and returned promptly to its flask. The loss in weight of each coupon was converted by standard methods to a corrosion rate in mils/year. Immediately thereafter the solution in which the coupon was immersed was colorimetrically analyzed for $Cr^{+6}$ and then carbon black was again added to two of the three flasks. This procedure was repeated each day thereafter. About one hundred hours after a coupon's corrosion rate attained a steady state, it was withdrawn and the test ended. The results are tabulated in Table I below.

Table I.—Effect of carbon black on the corrosion rate of 304L stainless steel in 6 M boiling nitric acid

| Original Solution | Reductant | Contents of solution | | | | Corrosion rate, mils/yr. | Type Stainless Steel | Hours of Test |
|---|---|---|---|---|---|---|---|---|
| | | $NO_3^-$, M | Fe, M | Cr, g./l. | Ni, g./l. | | | |
| $HNO_3$ | None | 10 | 0 | 0 | 0 | 3.8 | 304L | 100 |
| | Carbon | 5.8 | 0 | 0 | 0 | 6.0 | 304L | 156 |
| | do | 8.2 | 0 | 0 | 0 | 13.0 | 304L | 156 |

Reductant added at a rate of 2 grams/liter of solution/day.

The results in foregoing Table I illustrate the catalytic effect of carbon black on the corrosion of 304L stainless steel by 6 M boiling nitric acid solution. The corrosion rate was increased 2 and 4 fold over that obtained with no carbon black added. Example II demonstrates the effect of carbon black or sulfur on the corrosion of 304L stainless steel by a 6 M boiling nitric acid solution containing dissolved chromium.

EXAMPLE II

The same procedure as employed in Example I was employed except flowers of sulfur, at the rate of 2 grams/liter of boiling solution/day, was added to one flask with one of the 2 remaining flasks having carbon black added at rate of two grams/liter of boiling solution/day and the other flask having neither carbon black nor sulfur added. Also, each solution contained 14 grams of chromium/liter of solution dissolved therein. The corrosion rate of the stainless steel coupons was reduced by a factor of five by the addition of carbon black and by a factor of 18 by the addition of sulfur.

Table II.—Effect of reductant on the corrosion rate of
type 304L stainless steel in 6 M boiling nitric acid

| Original Solution | Contents of solution | | | | | Corrosion rate, mils/yr. | Type Stainless Steel | Hours of Test |
|---|---|---|---|---|---|---|---|---|
| | Reductant | $NO_3^-$, M | Fe, M | Cr g./l. | Ni, g./l. | | | |
| HNO$_3$+Cr | None | 6.8 | 0 | 14 | 0 | 56 | 304L | 303 |
| | Carbon | 6.8 | 0 | 14 | 0 | 10 | 304L | 230 |
| | Sulfur | 6.8 | 0 | 14 | 0 | 3.0 | 304L | 314 |

Reductant added at a rate of 2 grams/liter of solution/day.

Example III illustrates the effect of carbon black or sulfur on the corrosion of 304L and 309cb stainless by a 6 M nitric acid solution containing dissolved stainless steel.

EXAMPLE III

The same procedure as employed in Example I was generally followed, except that varying amounts of dissolved stainless steel was added to the flasks. Carbon black and/or sulfur was added at the rate of 2 grams/liter of solution/day with one flask having no reductants added. The reduction in the corrosion rate of 304L and 309cb stainless steel coupons by the addition of carbon black and sulfur to a boiling nitric acid solution is demonstrated in Table III.

Table III.—Effect of reductants on the corrosion of type
304L and 309cb stainless steel in 6 M boiling nitric acid

| Original Solution | Reductant | Contents of solution | | | | Corrosion rate, mils./yr. | Type Stainless Steel | Hours of Test |
|---|---|---|---|---|---|---|---|---|
| | | $NO_3^-$, M | Fe, M | Cr g./l. | Ni, g./l. | | | |
| HNO$_3$+dissolved stainless steel (Fe, Cr, Ni). | None | 8.6 | 1.2 | 20 | 10 | 150 | 304L | 173 |
| | Carbon | 8.1 | 1.2 | 20 | 10 | 42 | 304L | 173 |
| | do | 6.8 | 1.2 | 20 | 10 | 15 | 304L welded | 151 |
| | do | 7.9 | 1.1 | 18 | 9.0 | 29 | do | 161 |
| | do | 8.0 | 0.4 | 6.4 | 3.2 | 34 | do | 161 |
| | do | 8.4 | 1.1 | 19 | 9.5 | 30 | 304L | 135 |
| | do | 7.3 | 1.1 | 18 | 9 | 23 | 309cb | 151 |
| | Sulfur | 8.2 | 1.0 | 16 | 8 | 46 | 304L | 314 |
| | do | 8.2 | 1.0 | 16 | 8 | 63 | 304L | 314 |

It is therefore to be understood that all matters contained in the above description and examples are illustrative only and do not limit the scope of the present invention.

What is claimed is:

1. A method of substantially reducing the corrosive effect toward stainless steel of a boiling nitric acid solution containing dissolved chromium values in the +6 oxidation state which comprises adding to said solution a member selected from the group consisting of carbon black and elemental sulfur in sufficient amount to substantially reduce the corrosion of said stainless steel by said solution when heated to boiling, and thereafter contacting said stainless steel with said solution.

2. The method of claim 1 wherein said member is added to said solution at the rate of about 2 grams per liter of said boiling solution per day.

3. A method of substantially reducing the corrosive effect toward stainless steel of a boiling nitric acid solution containing dissolved chromium values in the +6 oxidation state which comprises adding to said solution carbon black in sufficient amount to substantially reduce the corrosion of said stainless steel by said solution when heated to boiling, and thereafter contacting said stainless steel with said solution.

4. The method of claim 3 wherein said carbon black is added to said solution at the rate of about 2 grams per liter of said boiling solution per day.

5. In the process which comprises heating an aqueous nitric acid solution containing dissolved chromium values in the +6 oxidation state in contact with stainless steel, the improvement comprising adding to said solution a member selected from the group consisting of carbon black and elemental sulfur in sufficient amount to substantially reduce the corrosion of said stainless steel by said solution.

6. In the process which comprises heating an aqueous nitric acid solution containing dissolved chromium values in the +6 oxidation state in contact with stainless steel, the improvement comprising adding to said solution carbon black in sufficient amount to substantially inhibit the corrosion of said stainless steel by said solution.

7. In the process of evaporating an aqueous solution containing nitric acid and dissolved chromium values in the +6 oxidation state in a stainless steel evaporating vessel in which said solution is boiled, the improvement comprising adding to said solution a member selected from the group consisting of carbon black and elemental sulfur in sufficient amount to substantially inhibit the corrosive effect of said boiling solution.

8. In the process of evaporating an aqueous solution containing nitric acid and dissolved chromium values in the +6 oxidation state in a stainless steel evaporating vessel in which said solution is boiled, the improvement comprising adding to said solution carbon black in sufficient amount to substantially inhibit the corrosive effect of said boiling solution.

9. In the process of evaporating an aqueous nitric acid solution containing dissolved iron, nickel and chromium, said chromium being in the +6 oxidation state, in a stainless steel evaporating vessel in which said solution is boiled, the improvement comprising adding to said solution a member selected from the group consisting of carbon black and elemental sulfur in sufficient amount to substantially inhibit the corrosive effect of said boiling solution.

References Cited by the Examiner

UNITED STATES PATENTS

| 2,238,651 | 4/41 | Keenen | 23—252 |
| 2,453,882 | 11/48 | Viles et al. | 21—2.5 |
| 2,994,190 | 8/61 | Burton | 252—387 |

DONALL H. SYLVESTER, *Primary Examiner.*